US009938491B2

(12) United States Patent
Castanon Delgado

(10) Patent No.: US 9,938,491 B2
(45) Date of Patent: Apr. 10, 2018

(54) WINE AERATOR

(71) Applicant: Gabriel Rodrigo Castanon Delgado, North Vancouver (CA)

(72) Inventor: Gabriel Rodrigo Castanon Delgado, North Vancouver (CA)

( * ) Notice: Subject to any disclaimer, the term of this patent is extended or adjusted under 35 U.S.C. 154(b) by 816 days.

(21) Appl. No.: 14/080,652

(22) Filed: Nov. 14, 2013

(65) Prior Publication Data

US 2014/0130681 A1 May 15, 2014

(51) Int. Cl.

| | |
|---|---|
| ***C12G 1/00*** | (2006.01) |
| ***B01F 3/04*** | (2006.01) |
| ***B01F 5/04*** | (2006.01) |
| ***B01F 13/00*** | (2006.01) |

(52) U.S. Cl.

CPC ............ *C12G 1/00* (2013.01); *B01F 3/04744* (2013.01); *B01F 5/0428* (2013.01); *B01F 13/0033* (2013.01); *B01F 2215/0072* (2013.01)

(58) Field of Classification Search

CPC ...... C12G 1/00; B01F 5/0428; B01F 13/0033; B01F 2215/0072; B05F 3/04744

USPC ...... 99/323.1; 473/387, 400; 261/110, 112.1, 261/DIG. 75

See application file for complete search history.

(56) References Cited

U.S. PATENT DOCUMENTS

| | | | | |
|---|---|---|---|---|
| 1,551,207 A * | 8/1925 | Nial | A63B 57/10 | 473/400 |
| 2,187,558 A * | 1/1940 | Kushima | A47G 19/2288 | 215/12.1 |
| 3,399,811 A * | 9/1968 | Miller | B65D 49/04 | 222/147 |
| D535,559 S | 1/2007 | Kehoe | | |
| 7,299,743 B2 | 11/2007 | Moore | | |
| 7,543,717 B2 * | 6/2009 | Hinkle | A47G 19/2205 | 220/508 |
| D619,431 S | 7/2010 | Wax | | |
| D640,904 S | 7/2011 | Wax | | |
| D660,078 S | 5/2012 | Kehoe | | |
| 8,597,141 B1 * | 12/2013 | Daniel | A63B 57/10 | 473/387 |
| 2002/0198066 A1 * | 12/2002 | Salsman | A63B 57/10 | 473/387 |
| 2007/0004538 A1 * | 1/2007 | Lim | A63B 57/10 | 473/387 |
| 2010/0025867 A1 * | 2/2010 | Benton | A47G 23/00 | 261/110 |
| 2010/0124594 A1 * | 5/2010 | Burroughs | A47G 19/2205 | 426/474 |
| 2011/0271846 A1 | 11/2011 | Hynes | | |
| 2011/0297001 A1 | 12/2011 | DeJohn | | |
| 2012/0201942 A1 | 8/2012 | Kilduff et al. | | |

FOREIGN PATENT DOCUMENTS

| | | |
|---|---|---|
| WO | 2011035198 | 3/2011 |

* cited by examiner

*Primary Examiner* — David Angwin
*Assistant Examiner* — John J Norton
(74) *Attorney, Agent, or Firm* — Cameron IP

(57) ABSTRACT

A wine aerator comprises a spherical aerating member and an open-mouthed hemispherical receptacle which releasably receives the aerating member. The receptacle has an inner surface, an outer surface, and an outlet. Projections project from the inner surface of the receptacle and support the aerating member within the receptacle. Ribs extend along the outer surface of the receptacle and space the receptacle apart from a wine glass.

17 Claims, 5 Drawing Sheets

WINE AERATOR

BACKGROUND OF THE INVENTION

Field of the Invention

The present invention relates to a wine aerator and, in particular, to a wine aerator that aerates wine as the wine is being poured into a wine glass.

Description of the Related Art

It is well known that aeration improves the aroma and flavour of wine. Decanters may be used to aerate wine and function by increasing the surface area of the wine while it is exposed to air. However, the wine needs to sit in the decanter for a period of time to aerate. It is therefore desirable to use aerators to rapidly aerate wine.

U.S. Patent Publication Number 2005/0205609, which was published on Sep. 22, 2005 in the name of Moore, discloses an open top glass vessel for aerating, filtering and dispensing wine. The vessel comprises a gravity fed container to collect and store wine, a glass sphere (containing a liquid medium) to introduce air to the wine as the wine passes over the glass surface, a stainless steel mesh to trap sediment and other debris normally introduced during the process of pouring wine from a bottle, and a valve to activate the flow of wine from the vessel to a drinking glass.

U.S. Patent Publication Number 2011/0297001, which was published on Dec. 8, 2011 in the name of DeJohn, discloses an aerator having a sphere, several rods that project upwardly from the sphere, and a filter that sits on the rods. The rods rest on the mouth of a wine glass with the sphere at or below the mouth. Wine is poured through the filter and onto the sphere to filter and aerate the wine before the liquid settles in the wine glass.

SUMMARY OF THE INVENTION

There is provided a wine aerator comprising an aerating member and an open-mouthed receptacle which releasably receives the aerating member. The receptacle has an inner surface, an outer surface, and an outlet. A plurality of projections project from the inner surface of the receptacle. The projections support the aerating member within the receptacle. The aerating member may be substantially spherical and the aerating member may have a circumferential protrusion. The receptacle may be hemispherical. There may be a plurality of ribs extending longitudinally along the outer surface of the receptacle. The projections may be pegs which form a cradle to support the aerating member within the receptacle. The aerating member may have a plurality of recesses or openings and each of the projections may engage a corresponding one of the recesses to support the aerating member within the receptacle.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
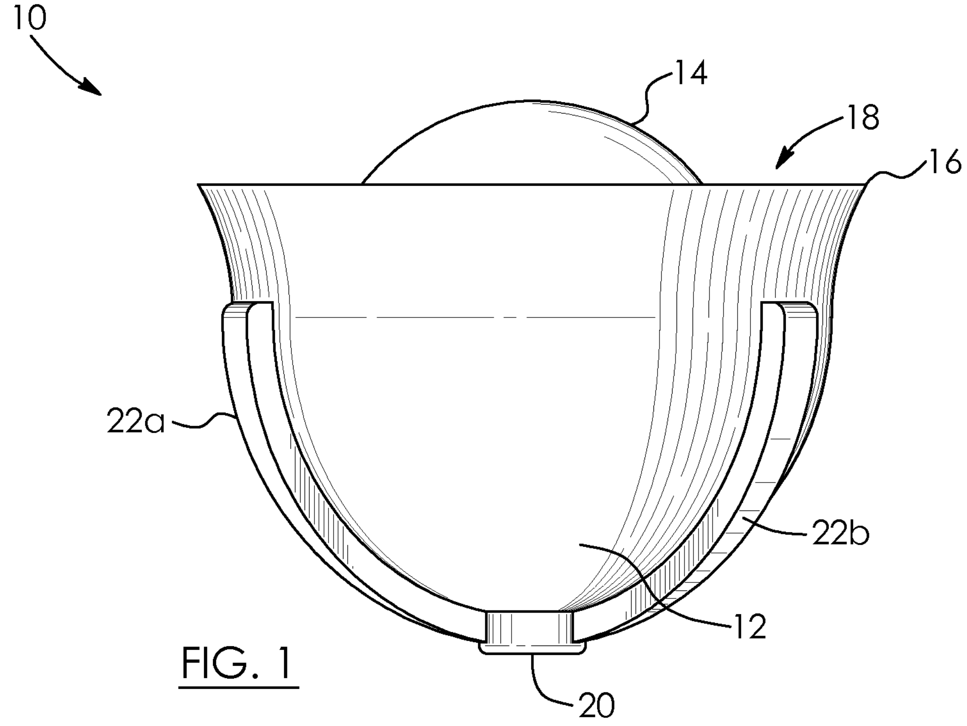
FIG. 1 is a side view of a first embodiment of an improved wine aerator.
Figure 2:
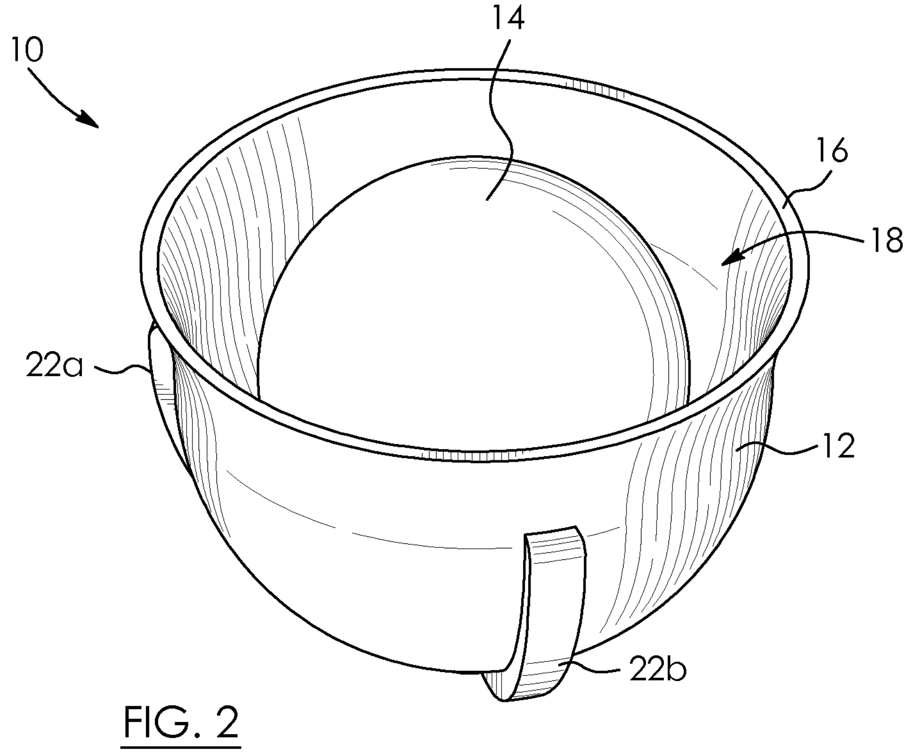
FIG. 2 is a top isometric view of the wine aerator of FIG. 1.
Figure 3:
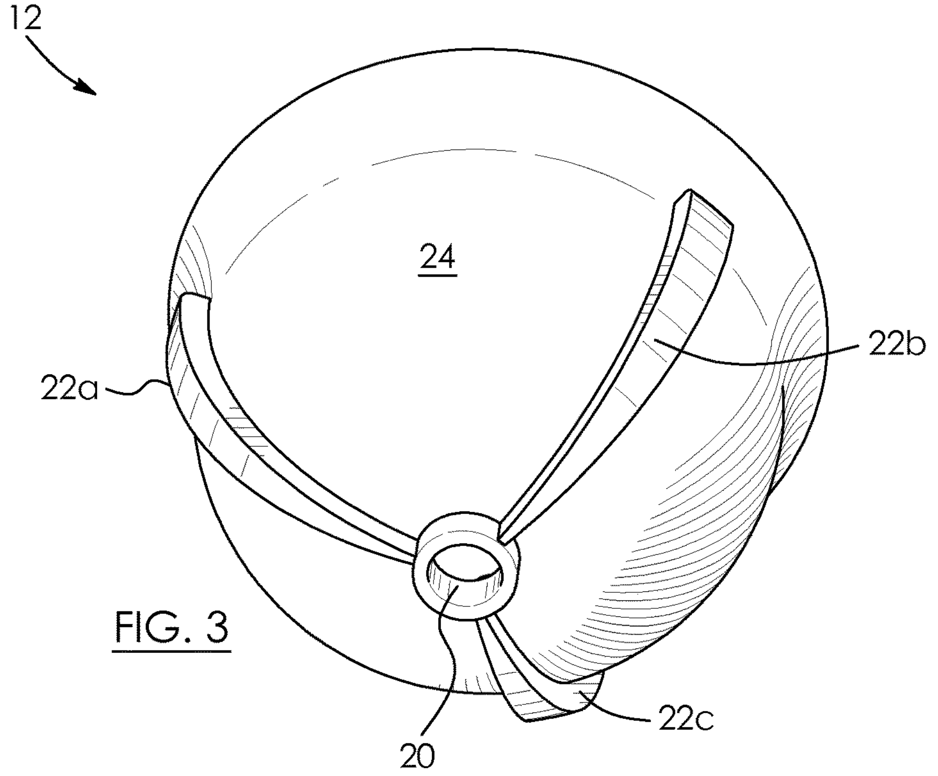
FIG. 3 is a bottom isometric view of a receptacle of the wine aerator of FIG. 1.
Figure 4:
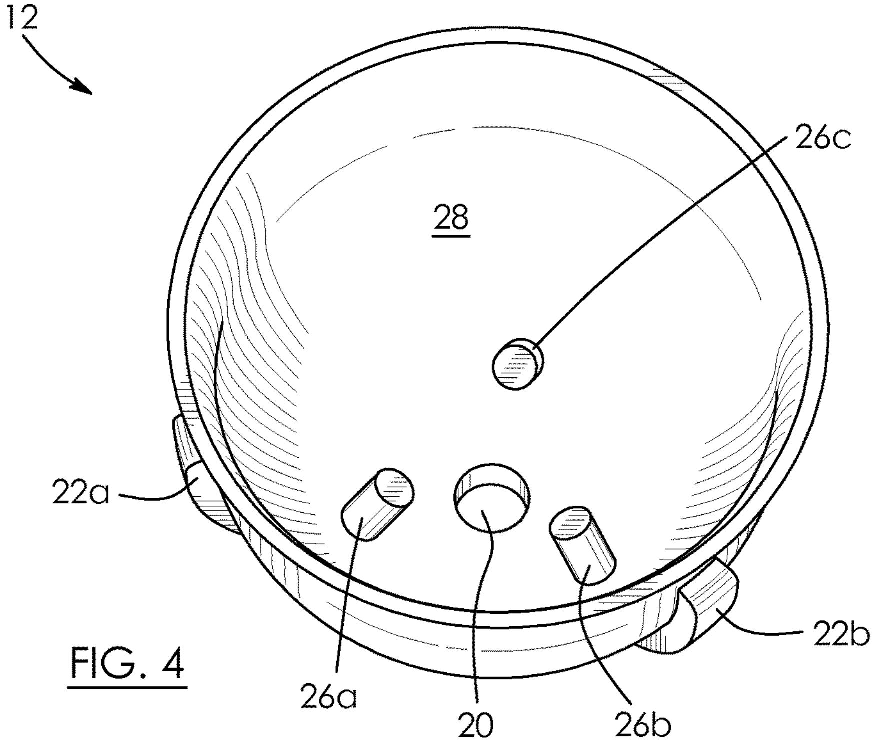
FIG. 4 is a top isometric view of the receptacle of the wine aerator of FIG. 1.
Figure 5:
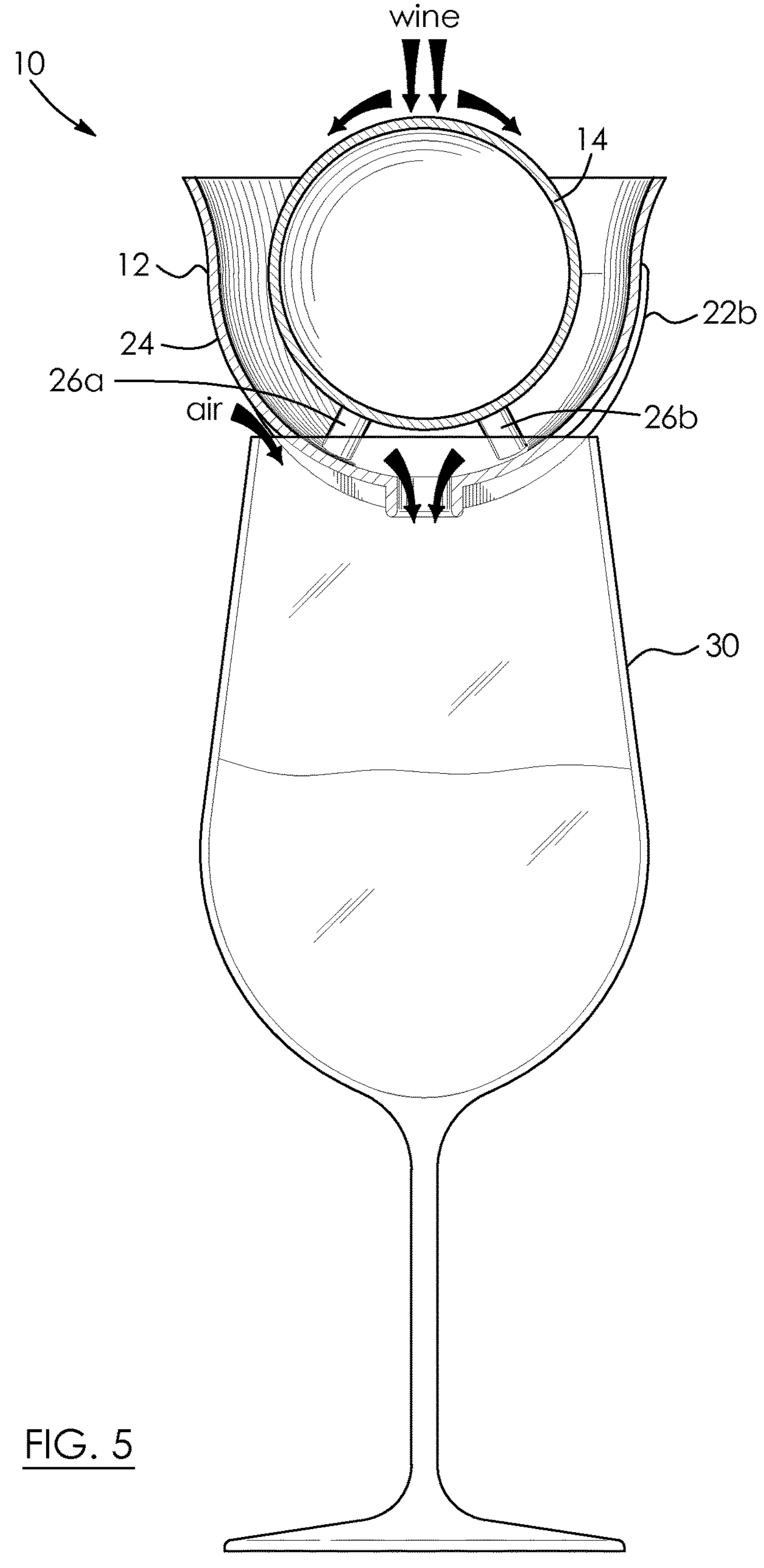
FIG. 5 is a partially sectional view of a wine glass and the wine aerator of FIG. 1.

Referring to the drawings and first to FIGS. 1 and 2, a first embodiment of an improved wine aerator 10 is shown. The wine aerator 10 comprises an open-mouthed receptacle 12 and an aerating member 14. The receptacle 12 receives the aerating member 14. In this example, the receptacle 12 is substantially hemispherical and the aerating member 14 is substantially spherical. The receptacle 12 has a rim 16 which defines an open mouth 18 and a bottom outlet 20 which is best shown in FIG. 3. There are ribs 22*a*, 22*b*, and 22*c* which extend radially outward from an outer convex surface 24 of the receptacle. Referring now to FIG. 4, there are inner projections in the form of pegs 26*a*, 26*b*, and 26*c* which project from an inner concave surface 28 of the receptacle 12. The projections project angularly from the inner concave surface 28 and form a cradle which supports the aerating member 14 within the receptacle 12. This is best shown in FIG. 5 in which the aerator 10 is coupled onto a wine glass 30. Wine poured into the aerator 10 flows over the aerating member 14, exposing the wine to the surrounding air and thereby aerating the wine. Furthermore, the wine dripping into the wine glass 30 is also exposed to the surrounding air because the ribs, as shown for one of the ribs 22*b* in FIG. 5, space the outer convex surface 24 of the receptacle 12 of the aerator 10 apart from the wine glass 30. This allows the surrounding air to flow into and within the wine glass.

Figure 6:
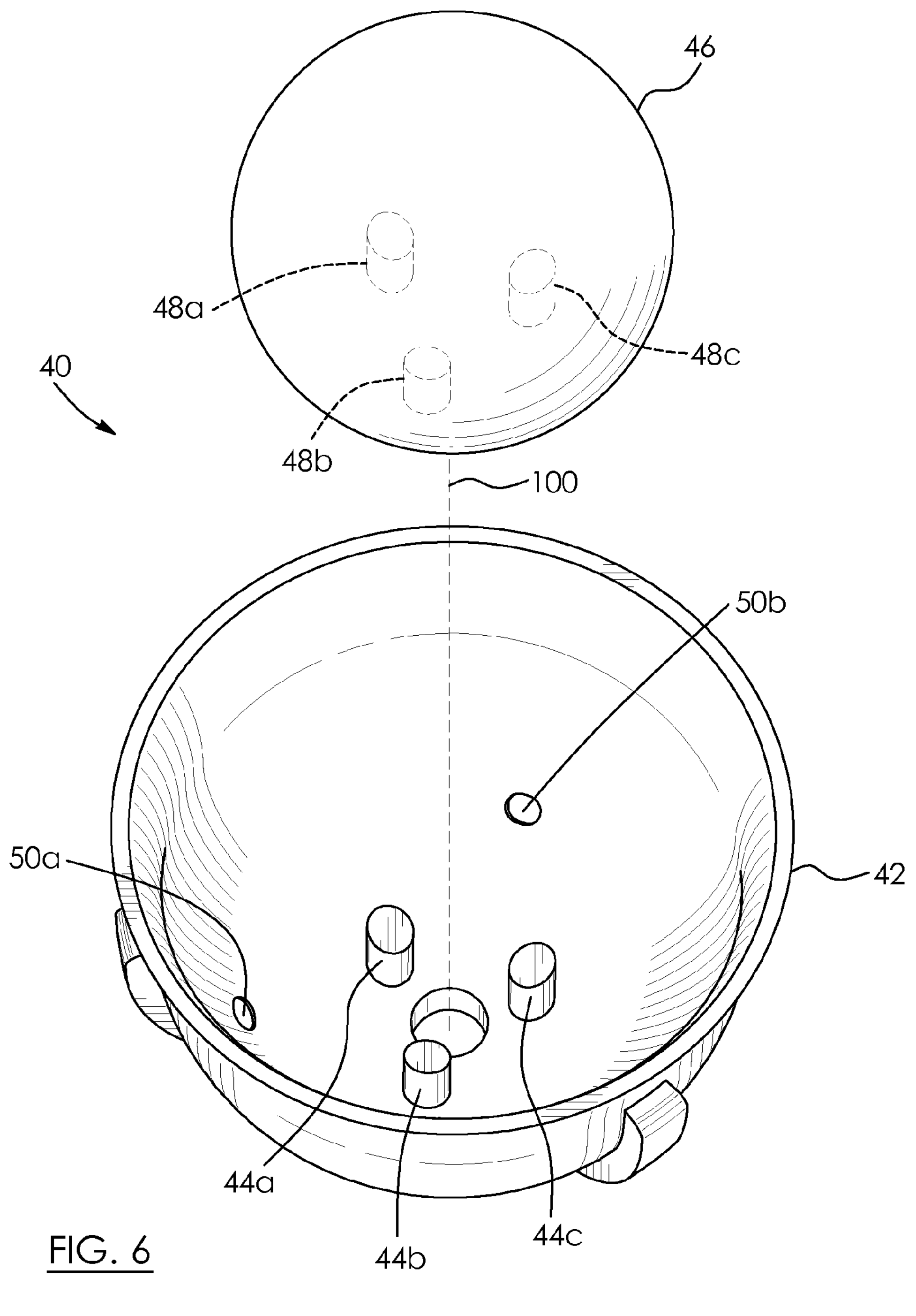
FIG. 6 is an exploded isometric view of a second embodiment of an improved wine aerator.

A second embodiment of an improved wine aerator 40 is shown in FIG. 6. The second embodiment of the wine aerator 40 is substantially similar to the first embodiment of the wine aerator 10 with the following exceptions. A receptacle 42 of the second embodiment of the wine aerator 40 is provided with pegs 44*a*, 44*b*, and 44*c* which extend substantially parallel to a longitudinal axis 100 thereof. An aerating member 46 of the second embodiment of the wine aerator 40 is provided with recesses 48*a*, 48*b*, and 48*c*. It will be understood that each of the pegs 44*a*, 44*b*, and 44*c* engages a corresponding one of the recesses 48*a*, 48*b*, and 48*c* to support the aerating member 46 within the receptacle 42. There are also radial outlets, for example lateral radial outlets 50*a* and 50*b*, in the receptacle 42.

Figure 7:
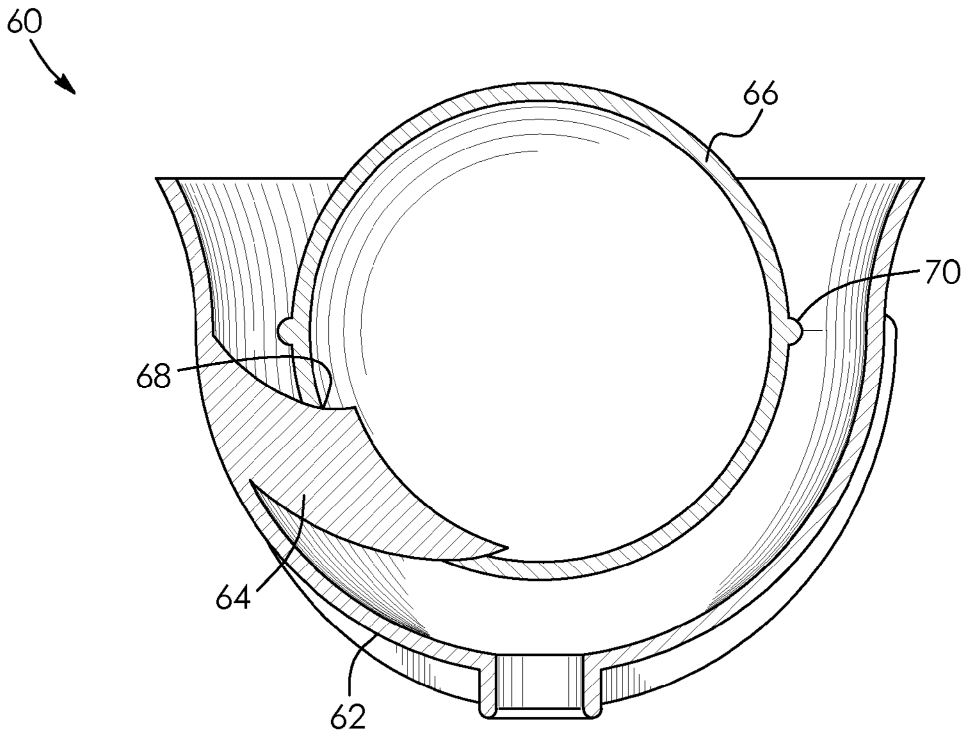
FIG. 7 is a sectional view of a third embodiment of an improved wine aerator.
Figure 8:
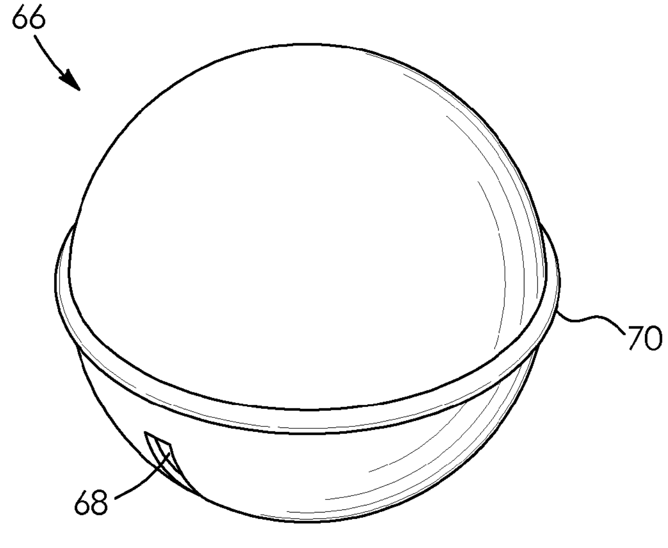
FIG. 8 is a top, side isometric view of an aerating member of the wine aerator of FIG. 7.

A third embodiment of an improved wine aerator 60 is shown in FIG. 7. The third embodiment of the wine aerator 60 is substantially similar to the first embodiment of the wine aerator 10 with the following exceptions. A receptacle 62 of the third embodiment of the wine aerator 60 is provided with inner projections in the form of fins, for example fin 64, and an aerating member 66 is provided with openings in the form of slots, for example slot 68, best shown in FIG. 8. Each of the fins engages a corresponding one of the slots, as shown for fin 64 and slot 68 in FIG. 7, to support the aerating member 66 within the receptacle 62. The aerating member 66 is also provided with a circumferential protrusion 70 which is best shown in FIG. 8. The circumferential protrusion 70 increases the surface area of the aerating member 66 and thereby increases the exposure of the wine to the surrounding air.

The aerating members of the wine aerators disclosed herein can be easily and rapidly separated from their respective receptacles. This facilitates cleaning of the wine aerators. Providing the aerating member and the receptacle as separate components may also facilitate manufacturing.

It will be understood by a person skilled in the art that many of the details provided above are by way of example only, and are not intended to limit the scope of the invention which is to be determined with reference to the following claims.

What is claimed is:

1. A wine aerator comprising:

a spherical aerating member; and an open-mouthed receptacle which releasably receives the aerating member, the receptacle having an inner surface, an outer surface, an outlet, and a plurality of spaced-apart projections which project from the inner surface of the receptacle and contact the aerating member to support the aerating member within the receptacle.

2. The wine aerator as claimed in claim 1 wherein the aerating member has a circumferential protrusion.

3. The wine aerator as claimed in claim 1 wherein the receptacle is hemispherical.

4. The wine aerator as claimed in claim 1 further including a plurality of ribs extending along the outer surface of the receptacle.

5. The wine aerator as claimed in claim 1 wherein the projections are pegs which form cradle to support the aerating member within the receptacle.

6. The wine aerator as claimed in claim 1 wherein the aerating member has a plurality of recesses and each of the projections engages a corresponding one of the recesses to support the aerating member within the receptacle.

7. The wine aerator as claimed in claim 1 wherein the aerating member has a plurality of openings and each of the projections engages a corresponding one of the openings to support the aerating member within the receptacle.

8. A wine aerator comprising:

a spherical aerating member; and an open-mouthed hemispherical receptacle which releasably receives the aerating member, the receptacle having an inner surface, an outer surface, an outlet, a plurality of spaced-apart projections which project from the inner surface of the receptacle and contact the aerating member to support the aerating member within the receptacle, and a plurality of ribs which extend longitudinally along the outer surface of the receptacle.

9. The wine aerator as claimed in claim 8 wherein the aerating member has a circumferential protrusion.

10. The wine aerator as claimed in claim 8 wherein the projections are pegs which form a cradle to support the aerating member within the receptacle.

11. The wine aerator as claimed in claim 8 wherein the aerating member has a plurality of recesses and each of the projections engages a corresponding one of the recesses to support the aerating member within the receptacle.

12. The wine aerator as claimed in claim 8 wherein the aerating member has a plurality of openings and each of the projections engages a corresponding one of the openings to support the aerating member within the receptacle.

13. A wine aerator for aerating wine being poured into a wine glass, the wine aerator comprising:

a spherical aerating member; and an open-mouthed hemispherical receptacle which releasably receives the aerating member, the receptacle having an inner surface, an outer surface, an outlet, a plurality of spaced-apart projections which project from the inner surface of the receptacle and contact the aerating member to support the aerating member within the receptacle, and a plurality of ribs which extend along the outer surface of the receptacle, wherein the ribs space the outer surface of the receptacle away from the wine glass to allow air to flow into the wine glass when the aerator is in use.

14. The wine aerator as claimed in claim 13 wherein the aerating member has a circumferential protrusion.

15. The wine aerator as claimed in claim 13 wherein the projections are pegs which form a cradle to support the aerating member within the receptacle.

16. The wine aerator as claimed in claim 13 wherein the aerating member has a plurality of recesses and each of the projections engages a corresponding one of the recesses to support the aerating member within the receptacle.

17. The wine aerator as claimed in claim 13 wherein the aerating member has a plurality of openings and each of the projections engages a corresponding one of the openings to support the aerating member within the receptacle.

* * * * *